United States Patent [19]

Raz et al.

[11] Patent Number: 5,887,151
[45] Date of Patent: Mar. 23, 1999

[54] METHOD AND APPARATUS FOR PERFORMING A MODIFIED PREFETCH WHICH SENDS A LIST IDENTIFYING A PLURALITY OF DATA BLOCKS

[75] Inventors: Yoav Raz, Newton; Steven M. Blumenau, Holliston, both of Mass.

[73] Assignee: EMC Corporation, Hopkinton, Mass.

[21] Appl. No.: 889,905

[22] Filed: Jul. 10, 1997

[51] Int. Cl.[6] .................................. G06F 9/38; G06F 9/30
[52] U.S. Cl. ........................ 395/382; 395/381; 395/584; 395/597
[58] Field of Search .................................. 395/383, 584, 395/597, 381, 382

[56] References Cited

U.S. PATENT DOCUMENTS

| | | | |
|---|---|---|---|
| 4,881,170 | 11/1989 | Morisada | 395/383 |
| 5,473,764 | 12/1995 | Chi | 395/383 |
| 5,634,025 | 5/1997 | Breternitz, Jr. | 395/383 |
| 5,721,864 | 2/1998 | Chiarot et al. | 395/383 |
| 5,721,865 | 2/1998 | Shintani et al. | 395/383 |
| 5,732,243 | 3/1998 | McMahan | 711/137 |
| 5,742,804 | 4/1998 | Yeh et al. | 395/584 |

Primary Examiner—Krisna Lim
Attorney, Agent, or Firm—Fish & Richardson P.C.

[57] ABSTRACT

A method of prefetching data within a data storage system that includes at least two levels of data storage including a first level and a second level and that also includes an intelligent controller that interprets and executes received commands from a host processor connected to the data storage system, the method including the steps of receiving a prefetch command that identifies a list of data blocks within the first level of data storage; and prefetching from the first level of data storage into the second level of data storage all of the data blocks identified in the list.

10 Claims, 2 Drawing Sheets

---

100 AT AN INTELLIGENT CONTROLLER WITHIN A DATA STORAGE SYSTEM, RECEIVE FROM A CONNECTED HOST PROCESSOR A MODIFIED PREFETCH COMMAND CONTAINING A LIST OF BLOCKS OF DATA THAT ARE STORED IN NON-CONTIGUOUS PHYSICAL LOCATIONS WITHIN A DISK STORAGE ARRAY IN THE DATA STORAGE SYSTEM.

110 REORDER THE LIST OF BLOCKS AND STORE THE RESULTS IN LOCAL MEMORY ACCESSIBLE TO THE CONTROLLER.

120 PREFETCH FROM DISK STORAGE INTO CACHE MEMORY THE BLOCKS IDENTIFIED IN THE REOREDERED LIST IN THE ORDER IN WHICH THEY APPEAR ON THE LIST.

METHOD AND APPARATUS FOR PERFORMING A MODIFIED PREFETCH WHICH SENDS A LIST IDENTIFYING A PLURALITY OF DATA BLOCKS

BACKGROUND OF THE INVENTION

The invention relates generally to data storage system on which data is prefetched for anticipated use by a requesting application.

Some high performance digital data storage systems which use an array of disk devices to store digital data also include high speed cache memory. The disk devices represent a more permanent storage area that provides protection against data loss due to unexpected power outages or other problems. However, since accessing the disk devices can typically be very slow in comparison to what is possible with semiconductor memory, the cache memory provides the actual staging area for reads and writes that are performed by the applications using the data storage system.

Thus, before a read or write of a particular block of data occurs, that block of data is first staged into cache memory. Then, the actual read or write operation is performed on it while it is in cache memory. After that block of data is no longer needed by the application, it is then destaged back to the disk storage devices. Since it is often the case that an application will also read or write to other blocks that are contiguous with or near the first block of data, one strategy is to move a larger portion of data from disk storage to cache memory in anticipation of future read and write operations. Thus, when the subsequent read or write operations occur, the data blocks will already be in cache memory and there will be no delay associate with having to retrieve them from the appropriate disk device. It is the ability to anticipate future read and write operations which provides one of the real advantages of using cache memory. And the strategy of moving larger portions of data into cache memory typically improves the performance of the data storage system considerably.

However, if the read and write operations that soon follow appear to be directed to a random sequence of data blocks, many of which are not within the portion of data that has been staged into cache memory, then the advantage of using the cache memory is considerably reduced. Indeed, if one attempts to access a random sequence of data blocks, the performance of the system significantly degrades.

SUMMARY OF THE INVENTION

In general, in one aspect, the invention is a method of prefetching data within a data storage system that includes at least two levels of data storage including a first level and a second level and that also includes an intelligent controller that interprets and executes received commands from a host processor connected to the data storage system. The method includes the steps of receiving a prefetch command that identifies a list of data blocks within the first level of data storage; and prefetching from the first level of data storage into the second level of data storage all of the data blocks identified in the list.

Preferred embodiments include the following features. The prefetching step is performed in a sequential order determined by the list. The data blocks of the list of data blocks are stored in non-contiguous physical locations within the first level of data storage.

In general, in yet another aspect, the invention is a program stored on a medium that is accessible to a controller within a data storage system having at least two levels of data storage including a first level and a second level, wherein the program is executed by the controller in response to receiving a prefetch command from a host processor that is connected to the data storage system and wherein the prefetch command passes a list of data blocks within the first level of data storage and causes the controller to perform the function of prefetching from the first level of data storage into the second level of data storage and in a sequential order, all of the data blocks identified in the list.

In general, in still another aspect the invention is a method implemented by an intelligent controller in a data storage system that includes at least two levels of data storage including a first level and a second level, wherein the intelligent controller interprets and executes received commands from a host processor connected to the data storage system. The method includes the steps of receiving a prefetch command that identifies a list of data blocks within the first level of data storage; and prefetching from the first level of data storage into the second level of data storage all of the data blocks identified in the list.

In preferred embodiments, the data blocks identified on the list are stored in non-contiguous physical locations within the first level of data storage. The method also includes the step of reordering the list, and the step of prefetching of all of the data blocks is performed in a sequential order that is specified by the reordered list. The method further includes the step of receiving by way of said prefetch command an instruction designating a behavior associated with the list of data blocks when stored in the second level of storage. The behavior relates to persistence.

As indicated above, accessing what appears to be random data by using conventional prefetch techniques can be notoriously slow. With the invention, however, it is possible to get access times down to where they would be if the data was sequential data. The invention is applicable to numerous different applications, including, for example, database systems, file systems, and web servers. It will produce a significant improvement in performance in all of those areas.

Other advantages and features will become apparent from the following description of the preferred embodiment and from the claims.

DESCRIPTION OF THE PREFERRED EMBODIMENTS

What is described herein is a new prefetch command which is supported within a data storage system. This new command, which shall be referred to as a modified prefetch command, enables an application running on a host processor to pass to the data storage system a list identifying a sequence of data blocks that are to be read by that application soon thereafter. In response to receiving the list, a controller within the data storage system starts prefetching the data blocks from disk storage into cache memory. Thus, the data blocks will be ready when the subsequent read or write operations arrive from the host processor. In short, the new command triggers the controller within the data storage system to start sequentially bring blocks identified in the list of blocks into cache memory. Shortly thereafter, the host independently starts to read the blocks that have been brought into the cache memory.

Figure 1:
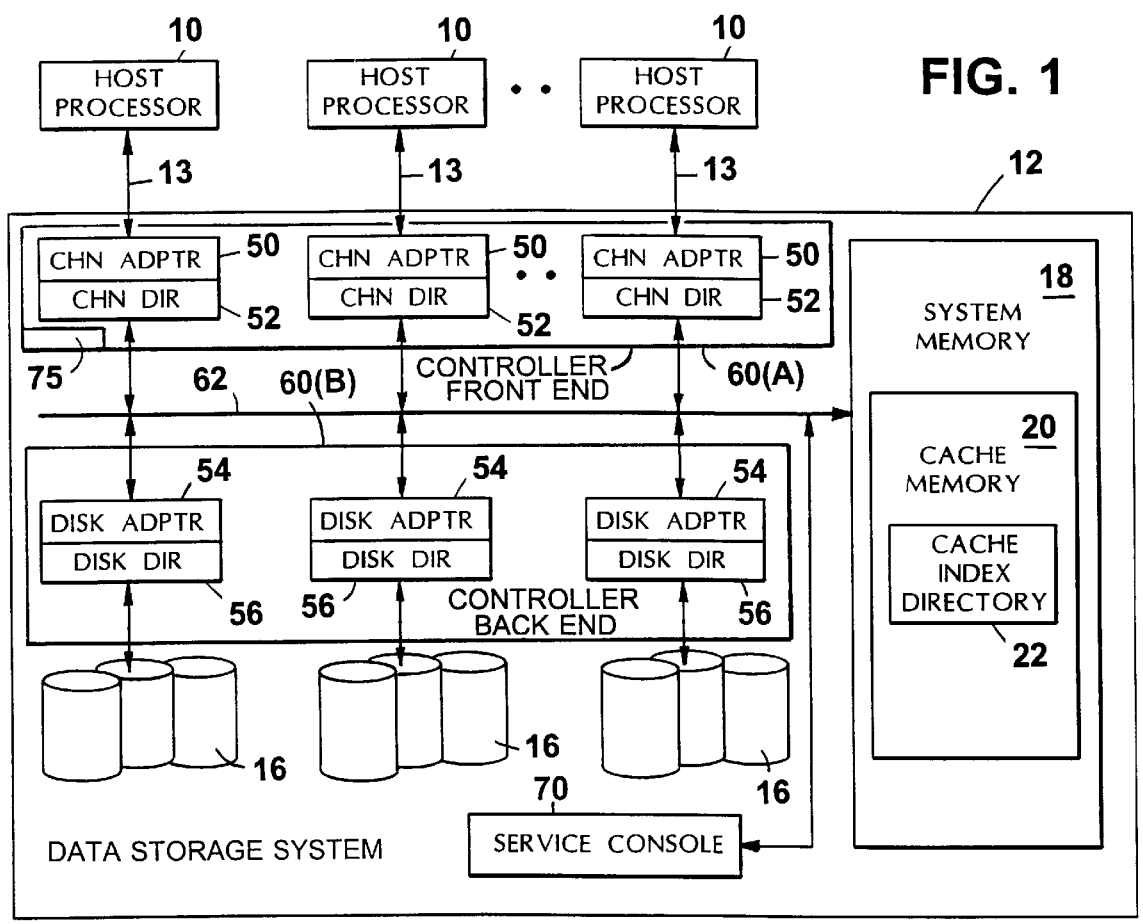
FIG. 1 is a block diagram of a data storage system in which the modified prefetch command is implemented.

Referring to FIG. 1, a system which embodies the invention includes a plurality of host processors 10 that are connected to a central data storage system 12 through respective host connections 13. Host processors 10 are digital processing units which include one or more CPU's and main memory. They might be, for example, workstations, PC's, symmetric multiprocessors (SMPs) or a massively parallel processor (MPP), which has many CPU's. Their number can range from only one processor to many.

In the described embodiment, host processors 10 have UNIX operating systems which provide the normal set of services that are typical of that operating system. In addition, communications over connections 13 between host processors 10 and data storage system 10 are handled in accordance with a SCSI bus protocol. SCSI, which stands for Small Computer System Interface, is a widely used peripheral interface for transferring data and commands between a host processor and external devices, such as a mass storage devices including disk drives, tape devices, and other a data storage devices. The SCSI bus protocol, of which there are currently three versions, namely, SCSI-1, SCSI-2 and SCSI-3, is a device independent I/O bus protocol. It makes available a number of commands for querying the devices connected to the SCSI bus about certain parameters.

It should, of course, be understood that the host processors could be running other operating systems and other interfaces could be used for communicating between the host processors and the data storage system. For example, the host processors could be running an IBM MVS operating system and the communication interface could be using channel command words.

Data storage system 12 contains the physical memory in which the data is stored. Examples of commercially available products that can be used to implement data storage system 12 are the Symmetrix 5XXX™ series family of products from EMC Corporation of Hopkinton, Mass., which are high performance integrated cache disk arrays designed for online data storage. The following details about the internal structure and operation of data storage system 12 generally apply to the Symmetrix™ data storage systems. However, it should be understood that other designs known to persons skilled in the art may also be used to implement data storage system 12.

Data storage system 12 includes multiple arrays of disk devices 16 and a system memory 18. In the described embodiment, system memory 18 is implemented by high-speed random-access semiconductor memory. A portion of system memory implements cache memory 42. The multiple arrays of disk devices 16 provide a permanent data storage area and cache memory 20 provides a fast as well as temporary data storage area. Each disk device within an array of disk devices 16 includes a head-disk assembly, a microprocessor, and a data buffer which enables the data storage system to provide for parallel processing of data. In the described embodiment, system memory 18 is implemented by high-speed random-access semiconductor memory. Within cache memory 20 there is a cache index directory 22 which provides an indication of what data is stored in cache memory 20 and the address of that data in cache memory 20. Cache index directory 22 is organized as a hierarchy of tables for devices, cylinders, and tracks of data records, as further described in U.S. Pat. No. 5,206,939, entitled "System and Method for Disk Mapping and Data Retrieval" and incorporated herein by reference.

There is a group of channel adapters 50 and channel directors 52 that provide interfaces through which host processors 10 connect to data storage system 12. These components make up what is referred to as the front end 60($a$) of the controller within the data storage system. Each channel adapter 50 provides for direct attachment to the physical host connections. Channel director 52 contains a microprocessor that processes commands and data from host processors 12 and manages accesses to cache memory 52. Channel director 52 handles I/O requests from host processors 10. It uses cache index directory 22 which is stored in cache memory 20 to determine whether the request can be satisfied out of the cache or whether the data must be obtained from disk devices 16. It maintains data in cache memory based on the data access patterns. Channel directors 52 write data from host processors 10 into cache memory 20 and update cache index directory 22. They also access cache index directory 44 and read data from cache memory 20 for transfer to host processors 10.

There is also a disk adapter 54 and a disk director 56 through which each disk device array 48 is connected to cache memory 42. These components make up what is also referred to as the back end 60($b$) of the controller within the data storage system. Disk adapter 54 interfaces to multiple SCSI buses 58 to which disk device arrays 16 are connected. Disk director 56 manages accesses to the disks within disk device arrays 16. Disk Director 56 stages data from the disk device arrays to cache memory 20 and it updates cache index directory 22, accordingly. It also destages or writes-back data from "written-to" blocks in cache memory 20 to the disk device arrays and again updates cache index directory 22, accordingly.

Disk adapters 54 and channel adapters 50 access system memory 18 through a high-speed, parallel line system bus 62. System memory 18 is implemented by multiple memory boards. Only one access to any given memory board may occur at any given time, however, multiple memory boards may be accessed at the same time to support concurrent operations, i.e., parallel transfer of data from disk storage to cache memory.

Data storage system 12 can be configured into multiple logical volumes. Typically, a volume corresponds to a single disk device. A service console 70 within data storage system 12 enables the user to configure the data storage, i.e., to define the logical volumes and to specify which logical volumes are accessible through which host connections 13.

A service console 70 within data storage system 10 enables the user to configure the data storage into multiple logical volumes, which are user-defined storage devices. In the described embodiment, a logical volume is a single physical device, e.g. disk, though it could also be a portion of a disk or multiple disks. Indeed, given that disks continue to grow in size as the technology advances, it is likely that it may be desirable in certain system to define the volume as a portion of a disk. In any event, logical volumes are mapped in an orderly manner to the physical devices.

Moving data between cache and the logical involves blocks of contiguous data, referred to herein as slots. In general, the slot is a region of address space which represents a contiguous set of records, where a record is as a block of data that is the smallest sequence of bytes that can be moved during an I/O operation. In an open system, it is typically 512 bytes and in an MVS system, it can have variable size.

In the described embodiment, address space is divided into a sequence of cache slots, each having a corresponding starting address and an ending address that is a predetermined distance above the starting address. That is, a cache slot is always mapped to a well defined location within virtual address space. The slot is the smallest unit of data that is moved between cache and the disk storage. In general, a slot has the characteristic that the order of the records within the slot is always maintained, regardless of where the slot is being stored, i.e., cache or disk. Thus, any given record within a slot is always found at the same relative position within that slot, which also means that each record within a slot always preserves its local neighborhood of other records.

In the described embodiment, the cache slot is a 32 Kbyte block of data. Cache memory 20 is large enough to hold over 100 thousand cache slots.

Controller 60 uses cache index directory 22 to keep track of all cache slots that are stored in the cache memory and where they are located.

Note that data storage system 12 also includes additional functionality and features which are typically found in such systems. Because such functionality and features are known to persons skilled in the art and are not of particular relevance to the invention described herein, they will not be described here. For further details about the design and functionality of such systems, the reader should refer to the technical literature and publicly available patents, including for example U.S. Pat. No. 5,335,352, entitled "Reconfigurable, Multi-Function Data Storage System Controller Selectively Operable as an Input Channel Adapter and a Data Storage Unit Adapter"; and U.S. Pat. No. 5,381,539, entitled "System and Method for Dynamically Controlling Cache Management", each of which is owned by the assignee of record and each of which is incorporated herein by reference.

With this example of a specific data storage system that can be used to implement the system, we will now provide further details about the modified prefetch command and relevant functional components which support that command.

The modified prefetch command has the following form:

CMD[sequence_of_blocks, cntrl_param]

The sequence_of_blocks parameter is a list of addresses of the blocks that are about to be read or written. Each address uniquely identifies the location of the block within disk storage. This means that the address identifies the device in which the block is stored and the location of the block within that device. The particular form of the address is not important so long as it provides a unique identifier of the location of the block. The format of the address will of course vary depending on whether the data is FBA data of CKD data.

In the SCSI system, the command can be implemented by overloading an existing SCSI command, for example, in the manner described in U.S. Ser. No. 08/602,614, entitled "System and Method for Emulating Mainframe Channel Programs by 'Open Systems' Computer Systems", filed Feb. 16, 1996, and incorporated herein by reference. SCSI commands that could be used include read_buffer, write_buffer, send_diagnostic, and receive_diagnostic, just to name a few. Alternatively, one could use the vendor specific commands that are defined for the SCSI protocol (e.g. the extended commands). If the host connection implements IBM's MVS operating system, then channel command words would be used and the modified prefetch command could be implemented by overloading one of the channel command words.

In any event, the approach of overloading an existing command enables one to use the native operating system features since the command that is used is a known command. Of course, it is also possible to define an entirely new modified prefetch command, but that would require modification of the operating system to recognize that command.

In the modified prefetch command, the cntrl_param parameter identifies the cache behavior that is desired. For example, it might indicate the timing or persistence of the cached data. In the case of a file system, for example, in which sequential accesses occur, once a block in a given file is read or written to, it will typically not be accessed again in the near future and, thus, it can be immediately cleared out of the cache memory to make room for other data blocks. In that case, the cntrl_param parameter would specify the non-persistence characteristic which notifies the controller that it can release blocks as soon as they are accessed by the application. On the other hand, if the cntrl_aram is set to request persistent treatment of the cached data blocks, then the controller will not automatically release the data block back to disk storage after a read or write of it is completed.

It should be understood that one can regulate how many blocks of data are requested from the host by the size of the list that is supplied to the controller. In other words, the host need not send the entire list that is provided by the application. In general, there is a relationship between how much should be prefetched and the delay between asking for prefetch and using the prefetched data. If the delay is too small (e.g. in the case of small files in file systems), then there will be little to no benefit to using the modified prefetch command since the I/O will be occurring too fast. On the other hand, if the delay is too long (e.g. in the case of a large file), then cache resources will be wasted while waiting for the read or write operation to occur for that block of data. In other words, it is not desirable to prefetch to far in advance of when the data will accessed by the application since that will tend to tie up valuable cache resources.

The list that is passed may not be arranged so that each successive prefetch request goes to a different disk device. For example, the first ten blocks may all reside on the same disk device and the eleventh block may reside on another disk device. The controller optimizes the arrangement of the list so that it is in a disk sequence order. That is, each successive block identified on the reordered list resides on a different disk device. This makes it possible to more fully exploit the parallelism.

To realize the maximum gain in performance that is possible with using the modified prefetch command, the data should be distributed across the physical disk storage devices so as to make it possible to move data from the disk storage devices to cache memory in parallel. If all of the data blocks reside on a single disk device or are accessible only through a single disk driver, then the transfers to cache memory would simply be like performing serial I/O, and the resulting advantages are considerably less for most applications. However, the moment that multiple disk storage devices are used and data is distributed across them, then it becomes possible to take advantage of parallelism in the transfer of data into cache from the disk storage devices since the accesses can be distributed across multiple disk drivers. The distribution of data across the devices can be implemented by some form of striping or by any other appropriate way of spreading data across the disks.

If the data is distributed across a sufficient number of devices in the disk array data storage system, then the modified prefetch command can produce an improvement in performance of about a factor of ten in comparison to that which is achievable using conventional techniques.

Of course, to achieve this level of improvement requires that a comparable level of parallelism in data movement can be achieved within the data storage system. In other words, the data should be distributed across the disk devices in a ratio of at least 10:1, i.e., it needs to be distributed across at least ten disk drives to achieve the highest level of performance. Of course, even in the data is distributed across fewer disks, there will still be a performance improvement, but not as much as is possible by distributing the data across more disks. Note that the 10:1 value is based on noting that a cache hit is roughly ten times faster than a cache miss. As the technology improves and gets faster, then this number is likely to be higher, in which case achieving the highest level of performance will require distributing the data across a larger number of disk devices.

It should be noted that database applications typically distribute data and implement stripping. Volume managers also typically implement some form of stripping. Thus, the availability of the modified prefetch command would not require new functionality be added but it may impact the strategy that is used in implementing the striping.

It also should be noted that even if all of the data blocks in the list reside on the same disk, one can still achieve some gain with the modified prefetch command. For one thing it avoids the overhead of having to reacquire control of the bus after a cache miss occurs.

To achieve a factor of ten improvement in performance with this command, the data should be distributed across at least ten drives and the size of the list of blocks should cover at least ten drives. Also, it has been observed that the requests should be about five steps ahead of the reading process. Thus, the list should probably include about 50 blocks. However, the optimal size of the list also depends very much on characteristics of the system, including CPU speed, etc. Thus, the optimum size of the list is something that really has to be empirically determined for each system setup. That is, it needs to be tuned for the system.

Figure 2:
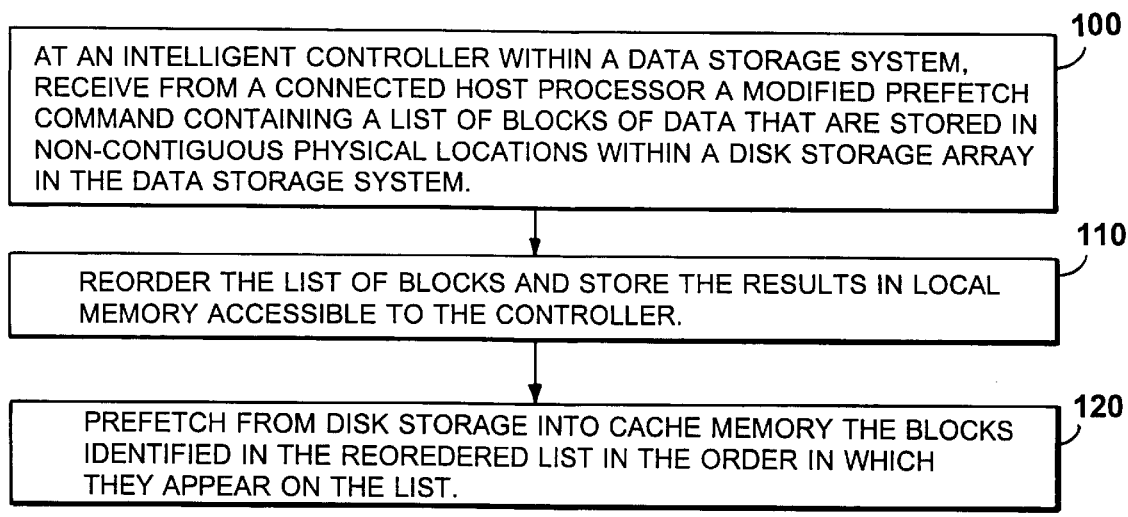
FIG. 2 is flow chart of the functions performed by the controller in response to receiving a modified prefetch command.

FIG. 2 shows the functionality that is implemented by the controller in accordance with the modified prefetch command. First, the controller receives from a connected host processor a modified prefetch command containing a list of blocks of data that are stored in a disk storage array in the data storage system (step 100). The blocks are likely stored in non-contiguous physical locations within the disk storage array, but that need not be the case. Upon receiving the command, it reorders the list in accordance with the principles stated above. In general, it reorders the list of blocks so that they are in disk sequence order and it stores the reordering information in locally accessible memory (step 110). Then, the controller prefetches from disk storage into cache memory the blocks identified in the reordered list and it does this in the order in which they appear on the reordered list (120). As a consequence, the data will be available in cache memory when the subsequent read and/or write commands arrive from the host.

Note that the modified prefetch command is most useful in connection with reads. However, it also has usefulness in connection with certain writes, for example, such as might occur in a parity based RAID system. The command allows the storage subsystem to prepare for a write which could require that either data or parity be read from the storage system to generate new parity. Another use is a read for parity based RAID in a degraded mode. When the storage system is in a degraded mode, it is rebuilding either the parity information of one of the disk's information because of a loss of a disk. If it is rebuilding data (rather than parity), then a read of that data will require that all other data in the parity set plus the parity be read to regenerate the missing data. The modified prefetch command allows the storage subsystem the extra time to execute the data regeneration operation before the application requests the data.

Also, as indicated above, the list of blocks might typically be a list of blocks that are stored in non-contiguous physical location within the disk array. It is likely that the greatest improvements in performance will be achieved for such an arrangement of blocks. However, the modified prefetch command can also be used to pass a list of blocks, some of which or all of which are stored in contiguous physical locations. If there are contiguous blocks in the list, they can be identified by specifying a range or interval rather than by having to specifying each of the individual blocks. Although using the modified prefetch with a random sequence of blocks will typically produce the greatest improvement in performance over what is possible in a conventional system, using it to pass a list of contiguous blocks also may produce advantages over the conventional approach to handling prefetch by, for example, circumventing or overcoming particular shortcomings that might be peculiar to that system when implementing a standard prefetch operation.

The functionality described above in connection with FIG. 2 can be implemented in microcode that is stored in a local ROM 75 (shown in FIG. 1) or in programmed instructions or routines that are stored in computer-readable memory that is accessible to the microprocessors within the controller.

The primary requirement placed on the application running on the host processor is that it be able to determine ahead of time the sequence of reads that is going to take place. But for many applications, this information can be readily determined.

For example, in the case of database applications which organize data as B-trees or B+-trees, there is an index of pointers that allows the application to access records very quickly. Typically, one record of that index contains hundreds of pointers to data blocks that are stored in the data storage in an almost random order. These indexes identify the access patterns that are likely to occur. And without the ability to use the modified prefetch command to send to the data storage system the list of locations identified in that index, there is no way for the data storage system to recognize the prefetch pattern that will be required.

In the case of UNIX file systems, there is an inode. The inode is an internal representation of the file which contains, among other things, a description of the disk layout of the file data. That is, it includes a set of pointers, each to a different block of data for the file which it represents. Those blocks of data may not be, and generally are not, contiguously stored in the data storage system. The inode identifies the sequence of data blocks that will need to be passed to the data storage system to read the file.

As stated above, if the number of data blocks that are prefetched is small, then the gain will typically not be significant. An exception to this is the case in which the time between reads is large. In that case, the benefit returns. An example is HTML, i.e., small files pointing at other small files. Even though the files are small, the delay associated in retrieving the files is large. So retrieving them in anticipation of the subsequent read or display of them provides a significant gain.

The modified prefetch command can be used in any system that does prefetch of data into intermediate storage (e.g. cache) for subsequent access by a requesting application. It applies to any storage system in which there is hierarchically arranged storage, including at least two levels. All that is required are to use the command is a cache memory, disk storage, and an intelligent controller, which is a processor-based module that is capable of interpreting and then executing the commands that are sent to it by the host processors which are connected to the data storage system. The intelligent controller distinguishes the system from one which just is a collection of storage disks.

The invention is meant to cover all of the above-mentioned alternative approaches as well as others not specifically mentioned. The above-mentioned embodiments and others are within the following claims.

What is claimed is:

1. A method of prefetching data within a data storage system that includes at least two levels of data storage including a first level and a second level and that also includes a controller that interprets and executes received commands from a processor that is external to and connected to the data storage system, said method comprising:

receiving from the processor a prefetch command that identifies a list identifying a plurality of data blocks within the first level of data storage, wherein each data block identified in the list represents a separate prefetch operation; and prefetching from the first level of data storage into the second level of data storage all of the data blocks identified in the list.

2. The method of claim 1 wherein the prefetching step comprises prefetching all of the data blocks in a sequential order determined by the list.

3. The method of claim 1 wherein the data blocks identified in said list are stored in non-contiguous physical locations within the first level of data storage.

4. The method of claim 1 wherein the prefetching step comprises prefetching all of the data blocks in a sequential order determined by the list.

5. A program stored on a medium that is accessible to a controller within a data storage system having at least two levels of data storage including a first level and a second level, wherein said program is executed by the controller in response to receiving a prefetch command from a processor that is connected to the data storage system and wherein the prefetch command passes a list identifying a plurality of data blocks within the first level of data storage, wherein each data block in the list represents a separate prefetch operation, and wherein the program in response to the controller receiving said prefetch command causes the controller to prefetch from the first level of data storage into the second level of data storage all of the data blocks identified in the list.

6. A method implemented by a controller in a data storage system that includes at least two levels of data storage including a first level and a second level, wherein said controller interprets and executes received commands from a processor that is external to and connected to the data storage system, said method comprising:

receiving a prefetch command that identifies a list identifying a plurality of data blocks within the first level of data storage, wherein each data block in the list represents a separate prefetch operation; and prefetching from the first level of data storage into the second level of data storage all of the data blocks identified in the list.

7. The method of claim 6 wherein the data blocks identified in said list are stored in non-contiguous physical locations within the first level of data storage.

8. The method of claim 7 further comprising reordering the list, and wherein the step of prefetching of all of the data blocks is performed in a sequential order that is specified by the reordered list.

9. The method of claim 7 further comprising receiving by way of said prefetch command an instruction designating a behavior associated with the data blocks identified in said list when stored in the second level of storage.

10. The method of claim 9 wherein the behavior relates to persistence.

* * * * *